INVENTORS.
WILLIAM I. LINLOR
BY QUENTIN A. KERNS

ATTORNEY.

INVENTORS.
WILLIAM I. LINLOR
QUENTIN A. KERNS
BY
ATTORNEY.

United States Patent Office 2,960,653
Patented Nov. 15, 1960

2,960,653
PULSED INDICATOR CIRCUIT

William I. Linlor, Livermore, and Quentin A. Kerns, Berkeley, Calif., assignors to the United States of America as represented by the United States Atomic Energy Commission Filed Mar. 15, 1956, Ser. No. 571,846

7 Claims. (Cl. 324—61)

The present invention relates to a sensitive measuring instrument and, more particularly, to a system for detecting changes in the terminating impedance of a shielded line.

In applications for measurement of externally induced variations in impedance, for example, in measuring rapid changes of pressure such as might be encountered in internal combustion engines or in the vicinity of an explosion, mechanical pressure gauges are generally unsatisfactory, both from the standpoint of inertia and the difficulty of indicating or recording pressure changes at a remote location as may be necessary for safety or space considerations.

An electronic system generally utilized for such applications utilizes a small variable sensing capacitor similar to that used in conventional condenser microphones with one stationary plate and one pressure sensitive flexible capacitor plate. Such sensing capacitor is connected in parallel with an inductance to form a resonant circuit in an oscillator. Variations in capacity due to pressure changes are manifested in frequency modulation of a radio-frequency signal. Such a system has the advantage of very low mechanical inertia since the capacitor plates can be made quite small. Such small size is frequently an advantage where the pressure gauge is to be placed in a small chamber or where approximation of a point measurement is required. However, a difficult problem is created in that the incremental capacity change is small. Generally, the sensing capacitor must be connected to the associated oscillator circuit through a coaxial cable, such cable itself having a relatively high distributed capacity. Thus, the capacity changes due to pressure variations are a very small portion of the total capacity. In an instance where a long coaxial line must be used, the capacity change resulting from pressure variations is such a small portion of the total capacity that inaccurate results are obtained.

The present invention retains the advantages of the foregoing frequency modulation system while mitigating the deleterious effects of cable capacitance. It operates by passage of short voltage pulses through a coaxial conductor in which the amplitude of pulses reflected back along the line is dependent upon the value of the line termination. In such case the sensing capacitor is the terminating element, thus the amplitude of reflected pulses is related to the pressure induced capacity variations. Such a system is independent of cable capacity, since pulses are transmitted along a shielded cable substantially without loss of signal amplitude.

It is an object of the present invention to provide an improved measuring instrument.

It is another object of the invention to provide a device measuring the terminating impedance of a transmission line.

It is a further object of the invention to provide an instrument for indicating rapid changes occurring in the impedance terminating a shielded line.

It is still a further object of the invention to provide a device for remotely indicating variations in the value of terminating impedance for a shielded transmission line.

It is another object to provide a gauge for remotely indicating rapid variations in fluid pressure.

Further objects and advantages of the invention will be apparent by reference to the accompanying drawings in which.

Figure 1:
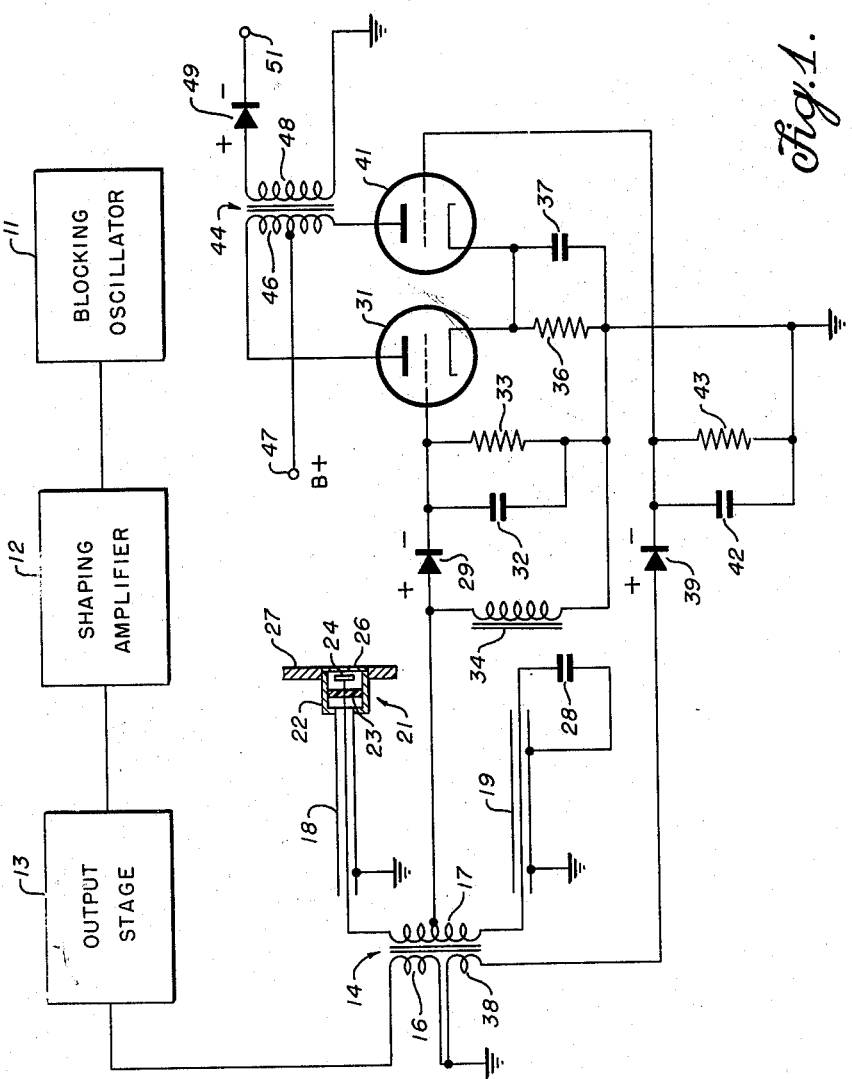
Figure 1 is a block and schematic drawing indicating the major components of the invention.

Referring now to Fig. 1 there is shown a conventional blocking oscillator 11 which produces output pulses having a thirty kilocycle repetition rate. In the preferred embodiment of the invention, the blocking oscillator 11 provides pulses having less than a .2 microsecond duration. A shaping amplifier 12 further narrows the pulse width and after amplification by a cascode output stage 13 the pulses have a 50 volt amplitude and a pulse width of less than .02 microsecond. While values have been set forth with respect to repetition rate and other pulse characteristics, such values are illustrative and are not to be considered as limiting in any respect.

An input transformer 14 has a primary coil 16 connected to the output of the output stage 13. A secondary coil 17 of the input transformer 14 has one end connected to the center conductor of a first coaxial cable 18 with the opposite end connected to a center conductor of a second balancing coaxial cable 19. Both the first and second coaxial cables 18 and 19 have approximately the same length. The first coaxial cable 18 is terminated by a sensing capacitor 21, such capacitor comprising an outside shell 22 of conducting material connected to the outer conductor of the cable and housing an insulator 23 which supports a stationary capacitor plate 24 in proximity to a flexible capacitor plate 26 mounted across an opening of the shell. The capacitor 21 may conventionally be mounted in a wall 27 of an evacuated or pressurized chamber. An adjustable balancing capacitor 28 is similarly connected between the center conductor and the grounded outside shield of the second coaxial cable 19. The positive terminal of a first rectifier 29 is connected to a center tap of the secondary coil 17 while the negative terminal is connected to the control grid of an amplifier tube 31. The control grid of the amplifier tube 31 is coupled to ground by a parallel-connected grid capacitor 32 and grid resistor 33. A choke coil 34 provides a path for direct current from the center tap of the secondary coil 17 to ground. The cathode of the amplifier tube 31 is coupled to ground by a parallel-connected cathode resistor 36 and cathode capacitor 37.

A single tertiary coil 38 on the input transformer 14 has one end connected to ground and the other end connected to the positive terminal of a second rectifier 39. The negative terminal of the second rectifier 39 is connected to the control grid of a comparison tube 41. The control grid of the comparison tube 41 is coupled to ground through a parallel-connected grid capacitor 42 and grid resistor 43, identical in value to the grid resistor 33 and the grid capacitor 32 of the amplifier tube 31. The cathode of the comparison tube 41 is directly connected to the cathode of the amplifier tube 31.

A pulse comparison transformer 44 has a center tapped primary winding 46, one end of the winding being connected to the plate of the amplifier tube 31, the other end being connected to the plate of the comparison tube 41, and the center tap being connected to a B plus plate voltage bus 47 to provide plate operating potentials. Voltages appearing across a secondary winding 48 of the comparison transformer 44 are proportional to the difference of the tube currents of the amplifier and comparison tubes, 31 and 41, thereby forming a difference amplifier. One end of the secondary winding 48 is connected to ground and the other end is connected to the positive terminal of an output rectifier 49, the negative terminal of which is connected to an output terminal 51.

Considering now the operation of the device, a single pulse applied to the primary coil 16 of the input transformer 14 produces a proportional pulse in the secondary coil 17 and in the first and second coaxial cables, 18, 19. Since the cables 18, 19 are equal in electrical characteristics, the load on the secondary coil 17 is symmetrical and appreciably no input pulse voltage appears at the secondary coil 17 center tap. If the sensing capacitor 21 and the balancing capacitor 28 are equal in capacity, the reflected pulses cancel and the voltage at the center tap of the secondary coil 17 remains zero. However, if the capacity of the sensing capacitor is altered due to a pressure variation, the amplitude of a reflected pulse from the first coaxial cable 18 and sensing capacitor 21 is varied and complete cancellation by the reflected pulse from the second coaxial cable 19 no longer occurs at the secondary coil 17 center tap.

In practice it has been found that a more linear representation of pressure variations is achieved if the value of the two reflected pulses does not cause nearly complete cancellation, owing to the nonlinear characteristics of the rectifiers at low amplitude signal levels. The invention is preferably operated so that complete cancellation is never achieved with normal pressure variations.

The choke coil 34 provides a path for direct current, but presents a high impedance to the pulses at the positive terminal of the first rectifier 29. The grid capacitor 32 of the amplifier tube 31 charges to the value of pulses which pass through the first rectifier 29, thus lengthening the pulse applied to the control grid of the amplifier tube. From the plate of the amplifier tube 31 the pulse is applied to half of the primary coil 46 of the comparison transformer 44 and through the output rectifier to the output terminal 51. The output signal is usually displayed on an oscilloscope where variations in pressure are shown as a series of pulses having varying amplitudes, the envelope of which indicates pressure variations.

The invention will operate basically as described without the inclusion of the tertiary coil 38 and associated components; however, the additional circuitry greatly increases sensitivity. A small portion of the input signal at the primary coil 16 is applied by the tertiary coil 38 to the control grid of the comparison tube 41, the control grid circuit being identical to the control grid circuit of the amplifier tube 31. The tertiary coil 38 is phased so that a portion of the output pulse from the output stage 13 appears as a positive voltage at the control grid of the comparison tube 41. The signal at the plate of the comparison tube 41 is applied to the primary winding 46 of the comparison transformer 44, partially canceling pulses from the amplifier tube 31 and leaving only the peak portion of the pulses where the amplitude variations occur. The remaining portion of the pulse is then more easily amplified without saturation of any required succeeding amplifiers.

Figure 2:
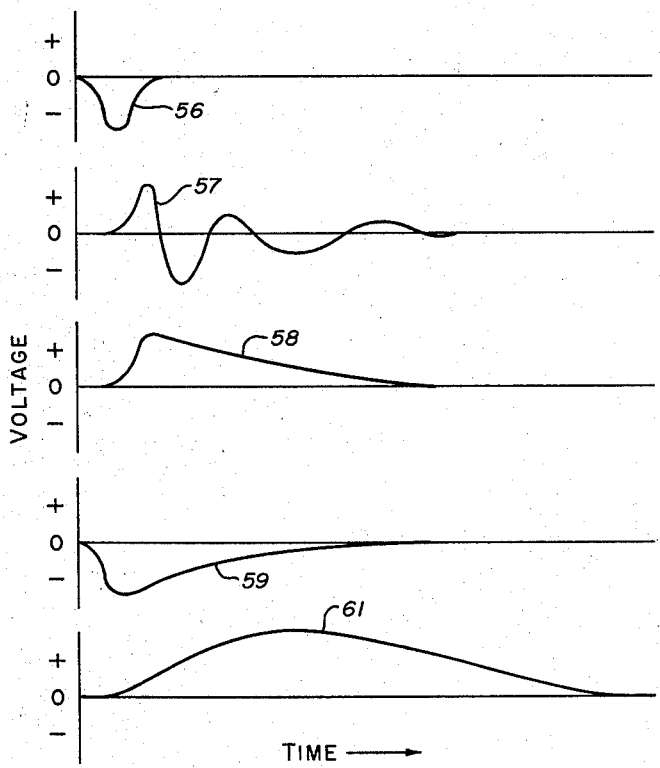
Figure 2 is a drawing of curves indicating voltage waveforms occurring within the device.

Referring now to Fig. 2, there are shown typical voltage waveforms occurring at certain points within the device, illustrated in Fig. 1. An input pulse waveform 56 represents the voltage applied to the primary coil 16 of the transformer 14. A center tap curve waveform 57 indicates a typical reflected pulse available at the center tap of the secondary coil 17. A first comparison curve waveform 58 indicates the input to the comparison transformer 44 from the amplifier tube 31. The first comparison curve 58 has an amplitude proportional to the rectified and filtered center tap curve 57. A second comparison curve 59 shows the input voltage applied to the comparison transformer 44 from the comparison tube 41. The second curve 59 has an amplitude proportional to the voltage induced into the tertiary winding 38 by the input pulse 56.

The first and second comparison curve waveforms 58 and 59 are combined in the comparison transformer 44, any remaining negative portions being removed by the output rectifier 49, resulting in an output pulse waveform 61 from the output terminal 51 to ground. The curves 56 to 61 are shown on a short time base; however, when the device is in practical use the output pulses 61 at the output terminal 51 are displayed on a conventional oscilloscope using a longer time base.

Figure 3:
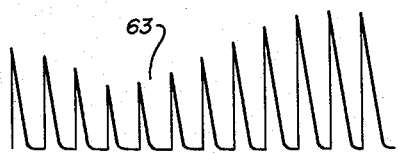
Figure 3 is a drawing of a typical oscilloscopic display of information as presented by the invention.

Referring now to Fig. 3, there is shown a representative oscillographic display curve 63 indicating pressure changes by the envelope of the pulse heights, each individual pulse being one output pulse 61 on a long time base.

While the embodiment of the invention described here utilizes a variable capacitor as the termination for the coaxial lines, it should be realized that a resistive or inductive termination will function similarly. For instance, a temperature sensitive resistor might be made the line termination or a vibration sensitive inductor might be utilized. Therefore, while the invention has been disclosed with respect to a single preferred embodiment, it will be apparent to those skilled in the art that numerous variations and modifications may be made within the spirit and scope of the invention and it is not intended to limit the invention except as defined in the following claims.

What is claimed is:

1. In a device indicating capacitance changes, the combination comprising a unidirectional pulse source having discrete pulses, a variable capacitor, a transmission line connecting said pulse source to said variable capacitor, said transmission line having a characteristic impedance different from the impedance of said capacitor to reflect pulses received thereat from said pulse source, a pulse discriminating circuit coupled to said transmission line and said pulse source to provide a symmetrical load thereon such that the discriminating circuit is receptive only to pulses reflected by said variable capacitor, and a measuring instrument connected to said discriminating circuit indicating the amplitude of pulses reflected from said variable capacitance.

2. In a device for indicating impedance changes in a circuit element, the combination comprising a unidirectional pulse generator producing discrete pulses, a shielded two conductor transmission line coupling the output of said pulse generator to said circuit element with the impedance of said line being different from the impedance of said circuit element to reflect pulses received thereat from along said line, the amplitudes of the reflected pulses being dependent upon the instantaneous impedance of said circuit element, a pulse input circuit coupled to said pulse generator and said transmission line with the transmission line and input circuit symmetrically loading the pulse generator such that the input circuit is receptive only to pulses reflected from said circuit element, a differential circuit connected to the output of said pulse input circuit, a cancellation circuit coupled from said pulse generator to said differential circuit for applying a potential to the latter equal to the amplitude potential of reflected pulses corresponding to the quiescent impedance of said circuit element, said differential circuit having an output proportional to the difference of potentials received from said pulse input circuit and said cancellation circuit.

3. In an instrument for measuring a variable impedance, the combination comprising a discrete pulse generator of D.C. pulses, a first two conductor transmission line coupling said pulse generator to said variable impedance with the variable impedance terminating said transmission line in a mismatch to produce pulse reflections along said transmission line, a fixed impedance, a second two conductor transmission line having characteristics essentially similar to said first transmission line and coupling said pulse generator to said fixed impedance, said second transmission line receiving pulses from said pulse generator in a phase opposite to those received by said first transmission line, said fixed impedance terminating said second transmission line in an impedance mismatch to produce pulse reflections along said second transmission line, an amplifier having an input coupled to both said first and said second transmission lines and receiving only pulses reflected therethrough, and a voltage measuring device coupled to the output of said amplifier.

4. In a pulsed indicating circuit, the combination comprising a discrete unidirectional pulse generator, a transformer having a center-tapped secondary winding and a primary winding, said primary winding connected to said pulse generator, a variable impedance, a first two conductor transmission line connected from one end of said secondary winding to said variable impedance, the characteristic impedance of said transmission line being different from said variable impedance, a fixed impedance, a second two conductor transmission line having a transit time substantially equal to said first transmission line and connected from the other end of said secondary winding to said fixed impedance, the characteristic impedance of said second transmission line being different from said fixed impedance, and a pulse amplitude indicator coupled to the center tap of said secondary winding.

5. In a device for measuring changes in fluid pressure, the combination comprising a voltage pulse source providing discrete unidirectional pulses, a pressure sensitive capacitor, a transformer having a center-tapped secondary winding with a primary winding connected to said pulse source, a first two conductor transmission line coupling said sensitive capacitor to one end of said secondary winding, said sensitive capacitor terminating said first transmission line in an impedance mismatch to reflect pulses received from said pulse source back along said line, a fixed capacitor, a second two conductor transmission line having a length approximately equal to said first line and coupling said fixed capacitor to the other end of said secondary winding, said fixed capacitor terminating said second transmission line in an impedance mismatch to reflect pulses received from said pulse source back along said line, a first rectifier coupled to the center tap of said secondary winding, and a first pulse amplifier stage having an input coupled to the output of said first rectifier.

6. A measuring device as described in claim 5 further characterized by a tertiary winding on said transformer, a second rectifier coupled to said tertiary winding, a second pulse amplifier stage having an input coupled to the output of said second rectifier, a pulse comparison circuit coupled to the outputs of said first and second amplifier stages, and a pulse amplitude indicating device connected to the output of said pulse comparison circuit.

7. In a circuit for an indicating device the combination comprising a unidirectional voltage pulse source having discrete output pulses, a phase splitter coupled to the output of said pulse source and providing inversely phased pulsed potentials at a first and a second output terminal, a variable impedance, a shielded two conductor transmission line coupling said first output terminal to said variable impedance with the variable impedance terminating the line in a mismatch and reflecting pulses received thereat along said line, a standard impedance, a second two conductor transmission line coupling said second output terminal to said standard impedance with the standard impedance terminating the second line in a mismatch and reflecting pulses received thereat along said second transmission line, a mixing circuit coupled to said first and second transmission lines and combining only signals reflected from said variable impedance and said standard impedance therethrough, and a voltage indicator coupled to the output of said mixing circuit.

References Cited in the file of this patent

UNITED STATES PATENTS

| | | |
|---|---|---|
| 2,143,094 | Swift | Jan. 10, 1939 |
| 2,611,811 | Yates | Sept. 23, 1952 |
| 2,633,019 | Alberecht et al. | Mar. 31, 1953 |
| 2,684,467 | Young et al. | July 20, 1954 |
| 2,705,744 | Bourseau et al. | Apr. 5, 1955 |
| 2,721,975 | Wojciechowski | Oct. 25, 1955 |

OTHER REFERENCES

"American Standard Definitions of Electrical Terms," AIEE TK 9.A61, copy 9.

Kline: "Techniques in Pulse Meas.," DuMont Oscillographer, July–September, 1953, part 2, pages 3–15.